US009424467B2

(12) United States Patent
Lawler (10) Patent No.: US 9,424,467 B2
(45) Date of Patent: Aug. 23, 2016

(54) GAZE TRACKING AND RECOGNITION WITH IMAGE LOCATION (71) Applicant: Disney Enterprises, Inc., Burbank, CA (US)

(72) Inventor: Andrea Lawler, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 769 days.

(21) Appl. No.: 13/830,226

(22) Filed: Mar. 14, 2013

(65) Prior Publication Data
US 2014/0267771 A1 Sep. 18, 2014

(51) Int. Cl.
G06K 9/00 (2006.01)
H04N 13/04 (2006.01)
G06T 7/00 (2006.01)
G06F 3/01 (2006.01)

(52) U.S. Cl.
CPC .......... G06K 9/00597 (2013.01); G06K 9/0061 (2013.01); G06K 9/00281 (2013.01); *G06F 3/013* (2013.01); *G06K 9/00604* (2013.01); *G06K 9/00617* (2013.01); *G06T 7/0038* (2013.01); *H04N 13/0484* (2013.01)

(58) Field of Classification Search
CPC .......... G06K 9/00281; G06K 9/00597; G06K 9/0061; G06F 3/013; H04N 13/0484; G06T 7/0038
See application file for complete search history.

(56) References Cited

U.S. PATENT DOCUMENTS

| 2008/0239092 | A1* | 10/2008 | Sugino | G06K 9/00281 348/222.1 |
| 2009/0225278 | A1* | 9/2009 | Chen | G06F 3/013 351/210 |
| 2011/0273731 | A1* | 11/2011 | Haikin | G06F 3/013 358/1.9 |
| 2012/0147328 | A1* | 6/2012 | Yahav | A61B 3/113 351/210 |
| 2012/0163678 | A1* | 6/2012 | Du | G06K 9/0061 382/117 |
| 2012/0219180 | A1* | 8/2012 | Mehra | G06F 3/013 382/103 |
| 2013/0155026 | A1* | 6/2013 | Dong | G06F 3/0425 345/175 |

OTHER PUBLICATIONS

D. Todorovic, "Geometrical Basis of Perception of Gaze Direction", 46 Vision Research 3549-3562 (Oct. 2006).*
L.A. Symons, K. Lee, C.C. Cedrone, & M. Nishimura, "What are you looking at? Acuity for triadic eye gaze", 131 J. Gen'l Psych. 451-469 (Oct. 2004).*
J. Gemmell, K. Toyama, C.L. Zitnick, T. Kang, & S. Seitz, "Gaze Awareness for Videoconferencing: A Software Approach", 7 IEEE MultiMedia 26-35 (Dec. 2000).*

(Continued)

*Primary Examiner* — David N Werner
(74) *Attorney, Agent, or Firm* — Patent Ingenuity, P.C.; Samuel K. Simpson (57) ABSTRACT

An image of a person is captured. A left eye image is located in the image. A right eye image is located in the image. A first quantity of left eye white pixels and a second quantity of left eye white pixels in the left eye image locate are determined. A left eye image ratio of the first quantity of left eye white pixels to the second quantity of left eye white pixels is calculated. A first quantity of right eye white pixels and a second quantity of right eye white pixels in the right eye image is calculated. A right eye image ratio of the first quantity of right eye white pixels to the second quantity of right eye white pixels is calculated. A gaze direction of the person is determined based upon an average ratio.

22 Claims, 9 Drawing Sheets

(56) References Cited

OTHER PUBLICATIONS

"Opengazer: open-source gaze tracker for ordinary webcams", http://www.inference.phy.cam.ac.uk/opengazer/, Nov. 30, 2009.

San Augustin, Javier, et al., "Evaivation of a Low-Cost Open Source Gaze Tracker," http://www.cse.iitk.ac.in/users/se367/11/papers/p77-san_augustin.pdf, Mar. 22-24, 2010.

* cited by examiner

GAZE TRACKING AND RECOGNITION WITH IMAGE LOCATION

BACKGROUND

1. Field

This disclosure generally relates to the field of computer systems. More particularly, the disclosure relates to gaze tracking computer systems.

2. General Background

Various entertainment environments, e.g., theme parks, attempt to track where various participants are looking within such environments. By tracking the gaze of a participant, a computing system may direct various animatronics, automated objects, or the like to interact with the participant. For example, a computing system within a theme park may direct an animatronic character from a movie to make a noise if a participant is looking at the animatronic character.

Entertainment environments currently utilize facial tracking software that attempts to determine if a participant is looking in the direction of an animatronic. Such facial tracking software is limited to being utilized within a relatively small distance of approximately two to three feet. In other words, most current facial tracking software will not be able to accurately determine if a participant is looking at an animatronic unless the participant is within a distance of approximately two to three feet from the animatronic. Further, the current facial tracking software utilized in most entertainment environments typically requires very particular lighting conditions. As a result, such facial tracking software may not work accurately if the lighting conditions vary rather than being fixed.

As an example of a current configuration, the IT University of Copenhagen has developed gaze tracking software that is utilized with an ordinary webcam to track pupil movement. Such configuration is not practical for an entertainment environment as the gaze tracking software does not function if the participant is farther than approximately two feet from the camera. Further, this current configuration does not predict where the participant is looking in space or the location of where the participant is in space.

Another example of a current configuration is the Opengazer configuration developed by Samsung and the Gatsby Foundation. The Opengazer configuration also utilizes pupil tracking in conjunction with a webcam. Although the Opengazer configuration predicts the direction of a participant's gaze, the Opengazer configuration can only be utilized for a maximum distance of two to three feet. Accordingly, the Opengazer configuration is also not practical for utilization in an entertainment environment.

Another current gaze tracking configuration is the Fraunhofer face tracking configuration. The Fraunhofer face tracking configuration does not track the eyes of the participant. Accordingly, the Fraunhofer face tracking configuration does not provide any indication as to where the eyes of the participant are in space. Further, the cameras that are utilized in conjunction with the Fraunhofer face tracking configuration are relatively much more expensive than a webcam. The Fraunhofer face tracking configuration does not currently work with less expensive cameras.

Yet another current gaze tracking configuration involves sending infrared ("IR") light into the corneas of the eyes of the participant and measuring the reflection of the IR light to detect if the participant is looking at the camera. This current gaze tracking configuration requires close proximity of the participant to the camera, e.g., the participant often wears goggles and is at a distance of no more than three inches from the face of to the camera. The participant having to wear goggles and be at such a close proximity is simply not practical for an entertainment environment.

Many theme park attractions typically involve interactions between participants and animatronics that are a distance greater than three to four feet. Further, many theme park attractions often involve varying lighting conditions, e.g., varying light intensity, varying colors, etc. It is believed that improvements in conventional face tracking systems are needed to better support interaction between participants and interactive devices within an entertainment environment.

SUMMARY

In one implementation of the disclosure, a computer program product is described. The computer program product includes a computer readable medium having a computer readable program stored thereon. The computer readable program while executing on a computer causes the computer to capture an image of a person. Further, the computer readable program while executing on the computer causes the computer to locate a left eye image in the image. In addition, the computer readable program while executing on the computer causes the computer to locate a right eye image in the image. The computer readable program while executing on the computer also causes the computer to determine a first quantity of left eye white pixels and a second quantity of left eye white pixels in the left eye image. The first quantity of left eye white pixels is determined from a distinct part of the left eye image than is the second quantity of left eye white pixels. Further, the computer readable program while executing on the computer causes the computer to calculate a left eye image ratio of the first quantity of left eye white pixels to the second quantity of left eye white pixels. In addition, the computer readable program while executing on the computer causes the computer to calculate a first quantity of right eye white pixels and a second quantity of right eye white pixels in the right eye image. The first quantity of right eye white pixels is determined from a distinct part of the right eye image than is the second quantity of right eye white pixels. The computer readable program while executing on the computer also causes the computer to calculate a right eye image ratio of the first quantity of right eye white pixels to the second quantity of right eye white pixels. Further, the computer readable program while executing on the computer causes the computer to calculate an average ratio of the left eye image ratio and the right eye image. The computer readable program while executing on the computer also causes the computer to determine a gaze of the person based upon the average ratio.

In another implementation of the disclosure, a process is described. The process captures an image of a person. Further, the process locates a left eye image in the image. In addition, the process locates a right eye image in the image. The process also determines a first quantity of left eye white pixels and a second quantity of left eye white pixels in the left eye image. The first quantity of left eye white pixels is determined from a distinct part of the left eye image than is the second quantity of left eye white pixels. Further, the process calculates a left eye image ratio of the first quantity of left eye white pixels to the second quantity of left eye white pixels. In addition, the process determines a first quantity of right eye white pixels and a second quantity of right eye white pixels in the right eye image. The first quantity of right eye white pixels is determined from a distinct part of the right eye image than is the second quantity of right eye white pixels. The process also calculates a right eye image ratio of the first quantity of right eye white pixels to the second quantity of right eye white pixels. Further, the process calculates an average ratio of the left eye image ratio and the right eye image ratio. In addition, the process determines a gaze of the person based upon the average ratio.

In yet another implementation of the disclosure, a system is described. The system comprises an image capture device that captures an image of a person. Further, the system comprises a gaze tracking system that locates a left eye image in the image, locates a right eye image in the image, determines a first quantity of left eye white pixels and a second quantity of left eye white pixels in the left eye image, calculates a left eye image ratio of the first quantity of left eye white pixels to the second quantity of left eye white pixels, determines a first quantity of right eye white pixels and a second quantity of right eye white pixels in the right eye image, calculates a right eye image ratio of the first quantity of right eye white pixels to the second quantity of right eye white pixels, calculates an average ratio of the left eye image ratio and the right eye image ratio, and determines a gaze of the person based upon the average ratio. The first quantity of left eye white pixels is determined from a distinct part of the left eye image than is the second quantity of left eye white pixels. The first quantity of right eye white pixels is determined from a distinct part of the right eye image than is the second quantity of right eye white pixels.

In another implementation of the disclosure, a process is described. The process captures an image of a person. Further, the process locates eye image data from the image. In addition, the process determines a first quantity of white pixels and a second quantity of white pixels from the eye image data. The first quantity of white pixels is determined from a distinct part of the eye image data than is the second quantity of white pixels. The process also calculates a ratio of the first quantity of white pixels to the second quantity of white pixels. Further, the process determines a gaze of the person based upon the ratio.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer program product, method, and system are utilized to provide gaze tracking. The gaze tracking configuration calculates the ratio of the amount of white in the eyes of a participant on either side of the iris for each eye of the participant. Further, the gaze tracking configuration estimates where the participant directs his or her gaze by averaging the ratios for both eyes of the participant.

As the whites of the eyes typically have more pixels than the pupil and iris, the whites of the eyes are typically bright enough to be detected in the image stream by an image capture device, e.g., a camera. By utilizing an image capture device in conjunction with the gaze tracking configuration, the gaze of a participant may be detected at distances much greater than prior configurations of two to three feet, e.g., distances in the range of at least ten to twelve feet. Further, the gaze of the participant may be detected in varying lighting conditions.

In one implementation, the gaze tracking configuration also utilizes the yaw of the head and the head's orientation as clues to estimate the gaze of the participant. Further, the gaze tracking configuration calculates the ratios and estimates gaze despite offsets of where the head of the participant may be positioned in space, i.e., the gaze tracking configuration detects where the participant is looking even if the head of the participant faces right while the eyes of the participant look left.

In contrast with previous pupil tracking configurations, the gaze tracking configuration provides more reliability at distances between the participant and the object that are realistic within an entertainment environment. Pupil tracking is unreliable at relatively long distances, e.g., greater than three feet, because only a small quantity of pixels are detected from a pupil in an image. Further, pupil tracking is often unreliable because some participants may have light or dark eyes. The varying color of the eyes of various participants prevents pupil tracking configurations from having a static benchmark that is applicable to most participants.

The gaze tracking configuration also provides more reliability at realistic distances within an entertainment environment than configurations that track the glint off of the eye. Following the glint of an eye requires very close proximity between the camera and the participant that is being tracked. Distances farther than approximately two feet involve the one or two pixels that comprise the glint in the participant's eye as blurry and difficult to detect. Further, detecting the glint of the eye is not suitable to varying lighting conditions as the glint with respect to the pupil or the center of the eye may change considerably with varying lighting conditions.

The gaze tracking configuration utilizes more pixels than previous configurations because the whites of the eyes often have more pixels than the pupil and the glint off the eye. Further, detecting the whites of the eyes avoids possible interference of other objects on the face such as eyelashes, eyebrows, etc. that often have dark features and may get confused by previous configurations with the pupils. In addition, the gaze tracking configuration allows for gaze tracking that is more invariant to changes in lighting conditions. As the whites of the eyes are so distinguishable in images of people from other pixel groupings on the face, the gaze tracking configuration detects gaze even in changing lighting conditions. As a result, the gaze tracking configuration is suitable for theme parks or other entertainment environments that generally have varying lighting conditions, e.g., from entertainment devices, environmental factors, or the like.

In addition, the gaze tracking configuration in accordance with the present invention can be implemented with relatively inexpensive image capture devices. Previous approaches utilized expensive head-mounted configurations that were expensive and cumbersome for participants to wear. In contrast with such approaches, the gaze tracking configuration is a relatively inexpensive configuration that provides ease of use to the participant.

Figure 1:
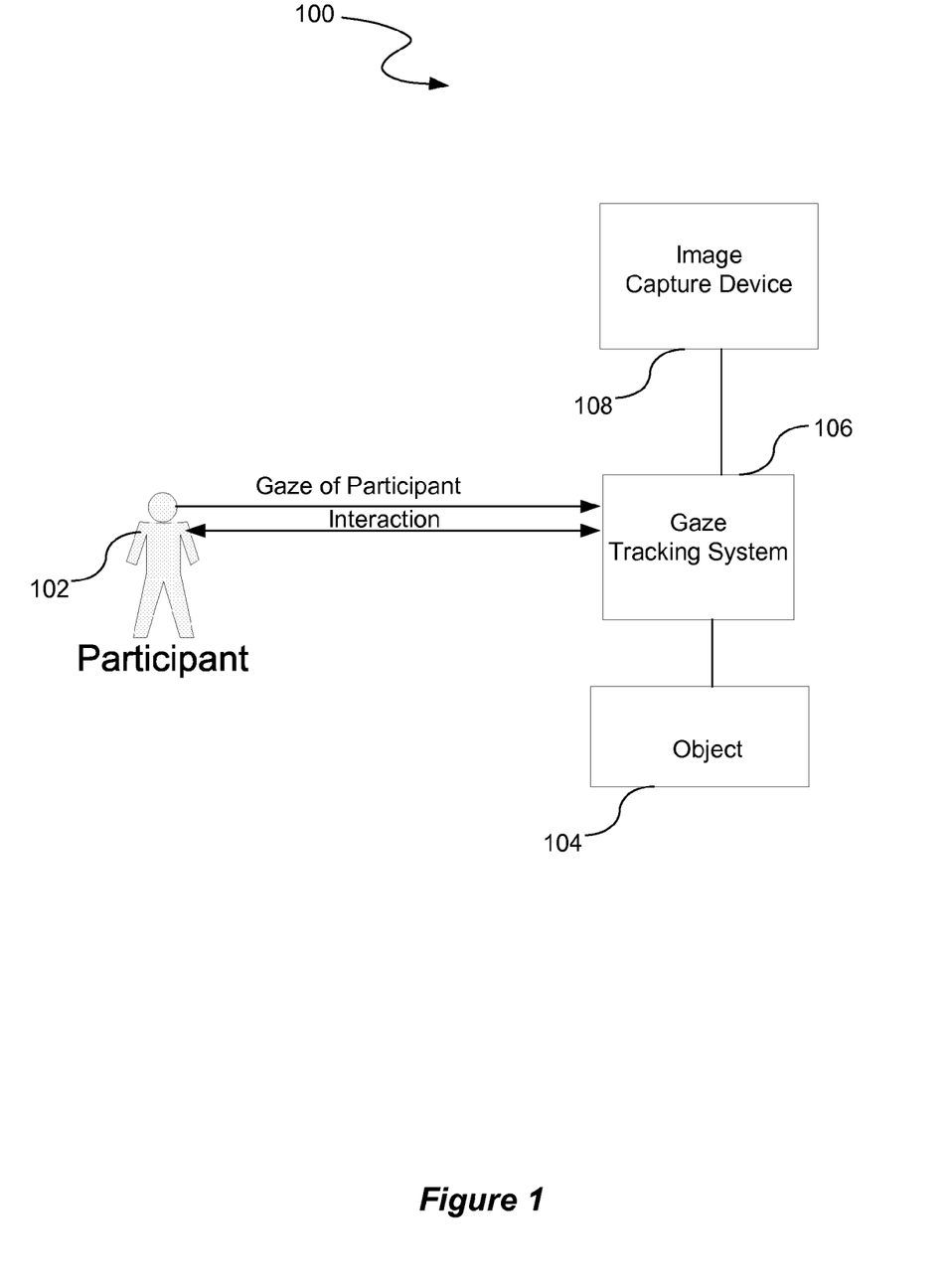
FIG. 1 illustrates a gaze tracking system that is utilized to track the gaze of a participant in an entertainment environment.

FIG. 1 illustrates a gaze tracking system 106 that is utilized to track the gaze of a participant in an environment 100. The participant 102 gazes at an object 104, which may be any type of object that draws the gaze of participant 102 such as an animatronic, robot, actor, puppet, product on a shelf, information display and the like. Upon detection of the gaze of the participant 102 at the object 104, an interaction may be initiated between the object 104 and the participant 102 by the object 104. For example, the object 104 may provide a greeting to the participant 102, sing a song, make a noise, make a movement, or the like.

The object 104 detects the gaze of the participant 102 with a gaze tracking system 106 and image data received from an image capture device 108. The gaze tracking system 106 analyzes image data received from the image capture device 108 to determine if the participant 102 is looking at the object 104. The gaze tracking system 106 counts the white pixels on either side of the iris for each eye of the participant 102 and estimates whether or not the participant 102 is gazing at the object 104 based upon the average of the ratios of the distances of white pixels to the irises of the participant 102. In yet another implementation, the average of the ratios of the areas of white pixels to the irises is utilized. The areas are defined as regions of pixels. A variety of other measurements may be utilized to quantify the amount of white pixels, e.g., regions defined by geometric shapes, borders, or the like.

In one embodiment, the image capture device 108 is in operable communication with the object 104, e.g., through a wireless communication, a wireline connection, a network connection, an integrated component of the object 104, or the like. The gaze tracking system 106 may be integrated within the object 104 or may be in operable communication with the object 104, e.g., wireless communication, wired connection, network connection, or the like.

The object 104 is described in some examples as an animatronic or interactive object merely for illustrative purposes. Object 104, more generally, represents anything, event or visual attractant for which it is desired to measure, sense or react to eye contact with participant 102. Object 104 may be programmable, puppeted, user controlled, or non-moving. Object 104 may be interactive or non-interactive, moveable or static. For example, object 104 may be a video camera in a stadium that utilizes information from the gaze tracking system 106 programmed to change orientation based upon a detection of a change in the gaze of a participant or a group of participants so that the video camera captures what the participant or the group of participants is gazing at. In some implementations, the gaze tracking system 106 detects the gaze of a particular participant. In other implementations, the gaze tracking system 106 detects the gaze of a group of participants simultaneously. Further, the gaze tracking system 106 may moves its tracking from face to face when multiple participants 104 are present and one or more a participant 104 looks away or if image data is misconstrued by image sensors.

The gaze tracking system 106 may be implemented in a variety of interactive or non-interactive types of machinery, displays, computers, or the like. In one aspect, the gaze tracking system 106 is implemented in an interactive machine such as the object 104 that responds to the participant 102 if viewed by the participant 102 as detected by the gaze tracking system 106. The object 104 responds with generic responses or specific responses depending upon the configuration. A generic response is a response such as a greeting that is provided by the object 104 upon detection of the gaze by the participant 102. A specific response is a response that is specific to the particular gaze and/or particular participant 102. The particular gaze is a gaze directed toward a portion of the animatronic, e.g., a gaze by the participant 102 directed toward a leg of the object 104 that prompts the object 104 to walk toward the participant 102. The particular participant is identified through various identity recognition methods, e.g., facial recognition, name tag, RF tag, or the like. The object 104 provides a customized response particular to the participant 102 that is gazing at the object 104, e.g., a greeting with the name of the participant 102.

Figure 2:
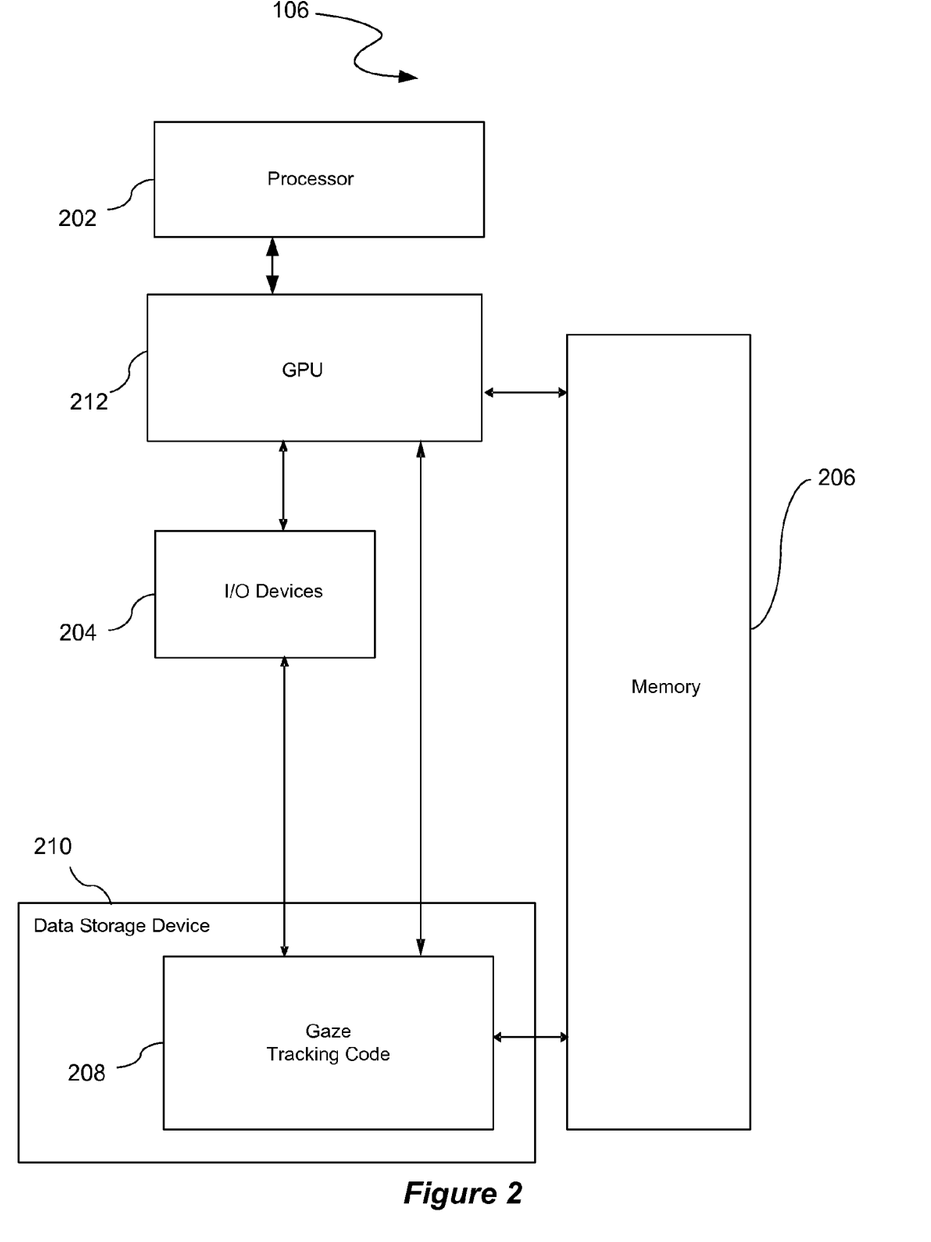
FIG. 2 illustrates the components of the gaze tracking system illustrated in FIG. 1.

FIG. 2 illustrates the components of the gaze tracking system 106 illustrated in FIG. 1. Gaze tracking system 106 may be implemented utilizing a general purpose computer, special purpose computer, or any other hardware equivalents capable of capturing eye images of a participant 104 and having sufficient processing capability to execute gaze tracking code 208. In the particular implementation shown in FIG. 2 gaze tracking system 106 comprises a processor 202, a graphics processing unit ("GPU") 212, a memory 206, e.g., random access memory ("RAM") and/or read only memory (ROM), gaze tracking code 208 stored, for example in data storage device 210, e.g., a magnetic or optical drive, diskette, or non-volatile memory, that provides instructions for gaze tracking calculation and detection, and various input/output ("I/O") devices 204, (e.g., audio/video outputs and audio/video inputs, a receiver, a transmitter, a speaker, a display, an image capturing device, e.g., those used in a digital still camera or digital video camera, a clock, an output port, a user input device (such as a keyboard, a keypad, a mouse, and the like, or a microphone for capturing speech commands)). In one implementation, the GPU 212 interfaces between the processor 202, the I/O devices 204, the memory 206, and the data storage device 210. Further, the GPU 212 may include a three-dimensional ("3D") core, embedded DRAM ("EDRAM"), and the like to quickly generate images in a frame buffer of the images captured by the I/O devices 204. The generated images may then be analyzed to perform gaze tracking. In one implementation, the set of gaze tracking code 208 may be implemented as a software application such as a mobile application, a desktop application, a web application, or the like.

In one implementation, the gaze tracking code 208 is loaded from a storage medium (not shown) associated with the data storage device 210 and executed by the processor 202 using the memory 206 of the system 106. Gaze tracking code 208 (including associated data structures) may be stored on a computer readable medium, e.g., RAM memory, magnetic or optical drive or diskette or the like.

FIGS. 3A-3E illustrate a variety of examples of the analysis performed by the gaze tracking system 106 on the image of the participant 102 captured by the image data capture device 108 illustrated in FIG. 1. The orientations described herein are from the perspective of the gaze of the participant 102. Accordingly, the term right is referred to from the rightward direction of the gaze of the participant 102, i.e., toward the left side in the figures, and the term left is referred to from the leftward direction of the gaze of the participant 102, i.e., toward the right side in the figures.

Figure 3A:
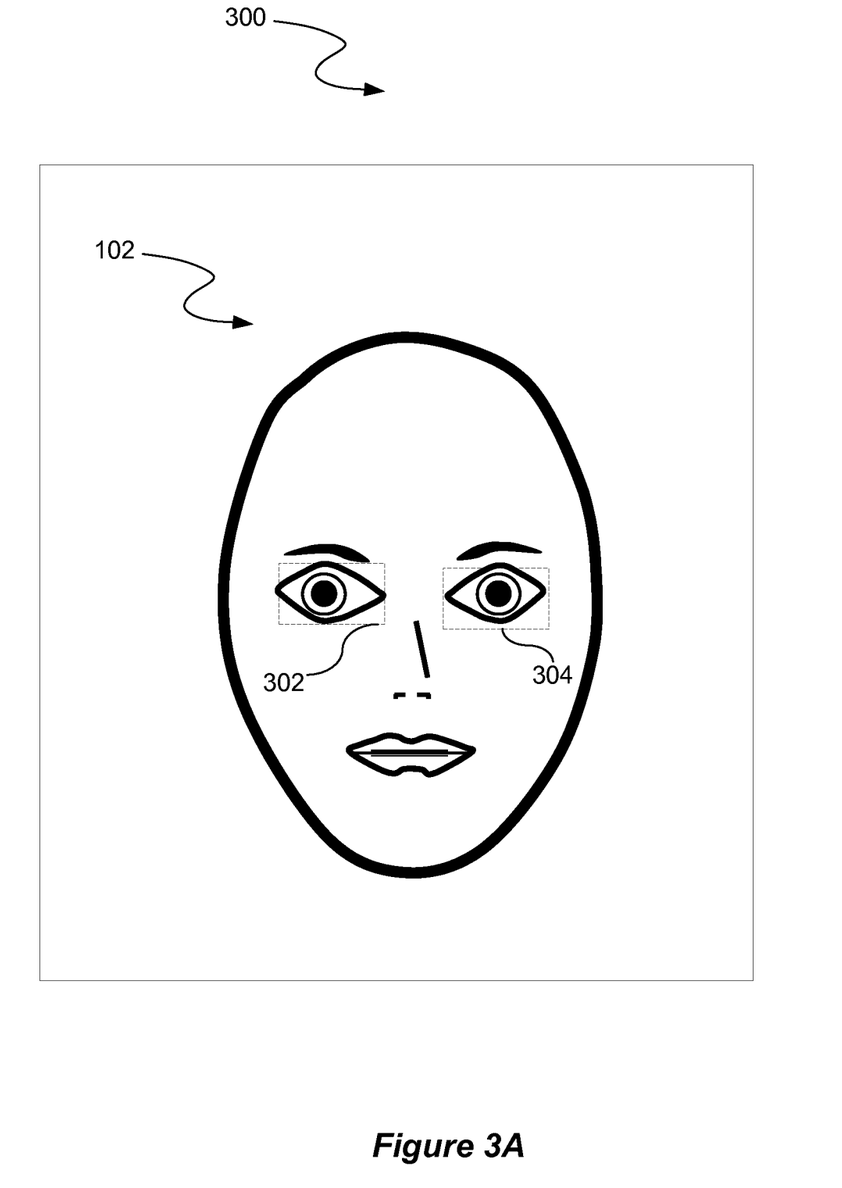
FIG. 3A illustrates an image of the face of the participant as captured by the image capture device.

FIG. 3A illustrates an image 300 of the face of the participant 102 as captured by the image capture device 108. The gaze tracking code 208 is utilized to locate the portions of the image 300 having the eyes of the participant 102. As an example, a right eye image 302 and a left eye image 304 are illustrated in FIG. 3A. The gaze tracking code 208 may utilize various shapes to indicate the images. For example, rectangles are utilized to outline the right eye image 302 and the left eye image 304 that are located by the gaze tracking code 208. Other types of shapes, e.g., squares, circles, ellipses, may be utilized to outline the images that are located. By providing such an outline, the gaze tracking code 208 is able to select only the data that corresponds to the whites of the eyes for the gaze tracking calculations. The gaze tracking code 208 may utilize any type of graphical representation to identify the located images and is not limited to any particular shapes. Alternatively, the gaze tracking code 208 records the images without any type of graphical representation in the image 300.

After the image locations have been determined, the white portions of the eyes are identified by the gaze tracking code 208. The gaze tracking code may utilize a variety of configurations to determine the white portions of the eyes, e.g., counting pixels within a specified tolerance of white, high contrast filtering, or the like. The ratio of a first set of white portions to a second set of white portions in each eye is then calculated. The first set of white portions and the second set of white portions are determined by calculating the portions with respect to proximity to the respective iris. The average of the two ratios is then calculated. Based upon the average of the ratios in both eyes, the gaze tracking code 208 calculates the gaze direction of the participant 102. As an example, the gaze direction is a vector that is calculated based upon the average orientation of the eyes in a particular direction.

Figure 3B:
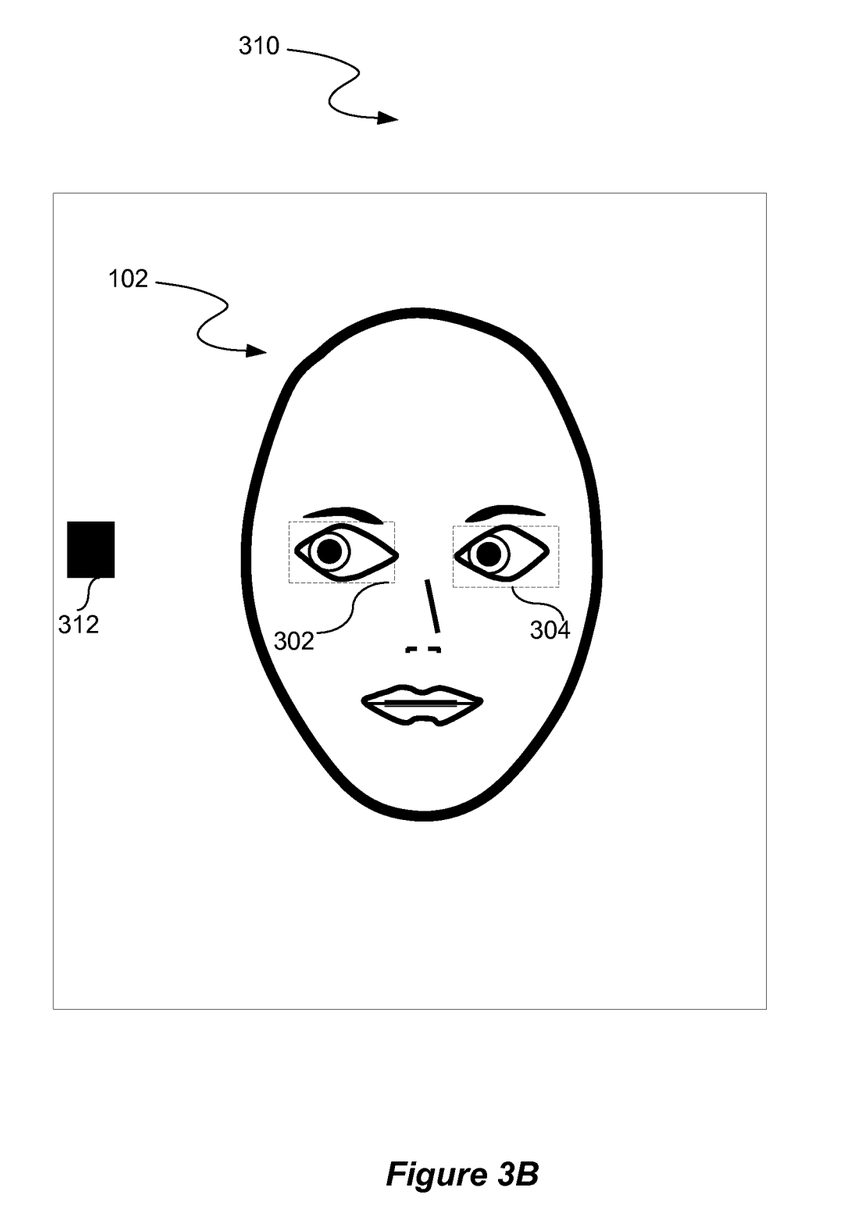
FIG. 3B illustrates an image of the participant in which the eyes of the participant are gazing to the right of the participant.

FIG. 3B illustrates an image 310 of the participant 102 in which the eyes of the participant 102 are gazing to the right of the participant 102. The head of the participant 102 is relatively straight. The gaze tracking code 208 locates the portions of the image 310 having the eyes, e.g., the right eye image 302 and the left eye image 304. The gaze tracking code 208 then calculates the distance of the whites of each eye with respect to each iris.

Figure 3C:
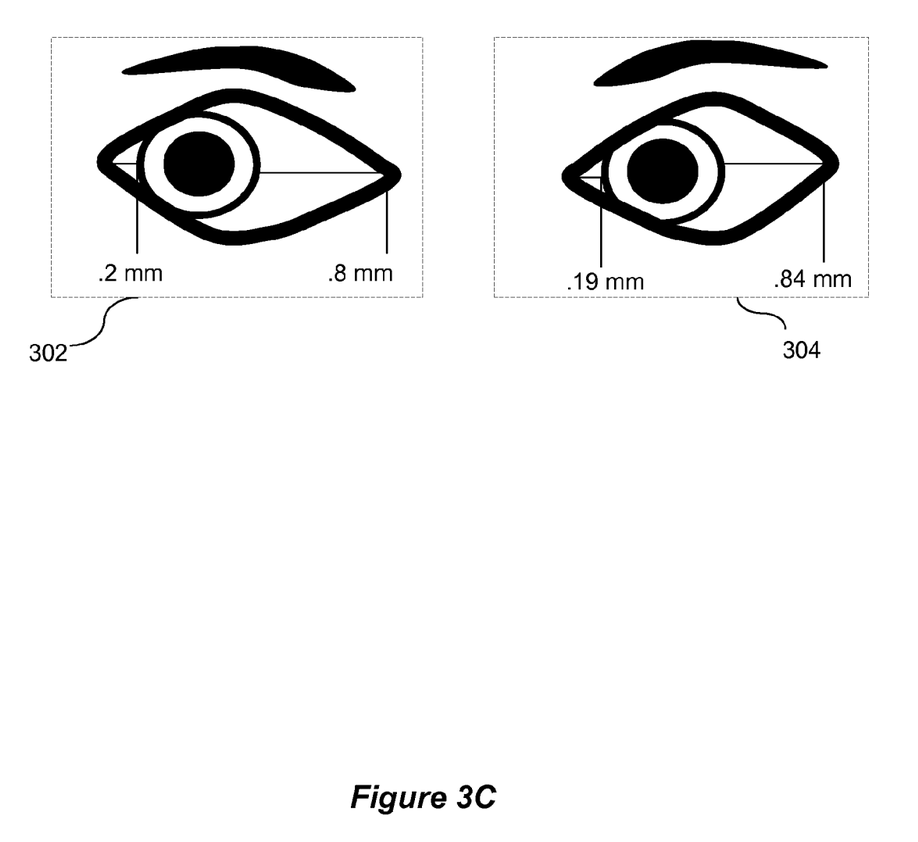
FIG. 3C illustrates an example of a calculation of the distance of the whites of each eye with respect to each iris of the right eye image 302 and the left eye image 304 illustrated in FIG. 3B.

FIG. 3C illustrates an example of a calculation of the distance of the whites of each eye with respect to each iris of the right eye image 302 and the left eye image 304 illustrated in FIG. 3B. As an example, the right eye image 302 has a distance of 0.2 mm of white from the right side of the right eye to the iris and 0.8 mm of white from the left side of the right eye to the iris of the right eye. As a result, the ratio of the amount of white from the left side of the right eye to the iris of the right eye to the amount of white from the right side of the right eye to the iris is a ratio of 4:1 for the right eye. Further, the left eye image 304 has a distance of 0.19 mm of white from the right side of the left eye to the iris and 0.84 mm of white from the left side of the left eye to the iris of the left eye. As a result, the ratio of the amount of white from the left side of the left eye to the iris of the left eye to the amount of white from the right side of the left eye to the iris is a ratio of 4.42:1 for the left eye. A difference in the ratio for each eye is possible as each eye is possibly a different distance from an object at which the eyes are gazing if the object is not directly in front of the participant 102, e.g., the participant 102 gazes at an object to the side without completely turning his or her head to directly face the object. The gaze tracking code 208 then averages the ratios. As a result, the calculated average ratio equals 4.21:1. The average ratio indicates that the eyes of the participant 102 are turned toward the right by an amount such that 4.21 mm of white from a left side of an eye to an iris is present for one mm of white from the right side of an eye to an iris. The gaze tracking code 208 then calculates the direction of the gaze of the participant 102 based upon the amount the eyes are turned in the rightward direction as provided by the average ratio.

In one implementation, the gaze tracking code 208 provides a gaze graphic representation 312 of the direction of the gaze of the participant 102, e.g., a polygon or other shape that is positioned within the image 310 to indicate the gaze of the participant 102. Alternatively, the gaze tracking code 208 records the gaze without illustrating the gaze graphic representation 312.

The illustrations provided in FIGS. 3B and 3C are provided merely as examples. Various other gaze directions may be calculated. The gaze in horizontal, vertical, and/or diagonal directions are calculated in a similar manner as to that described with respect to FIG. 3B.

Figure 3D:
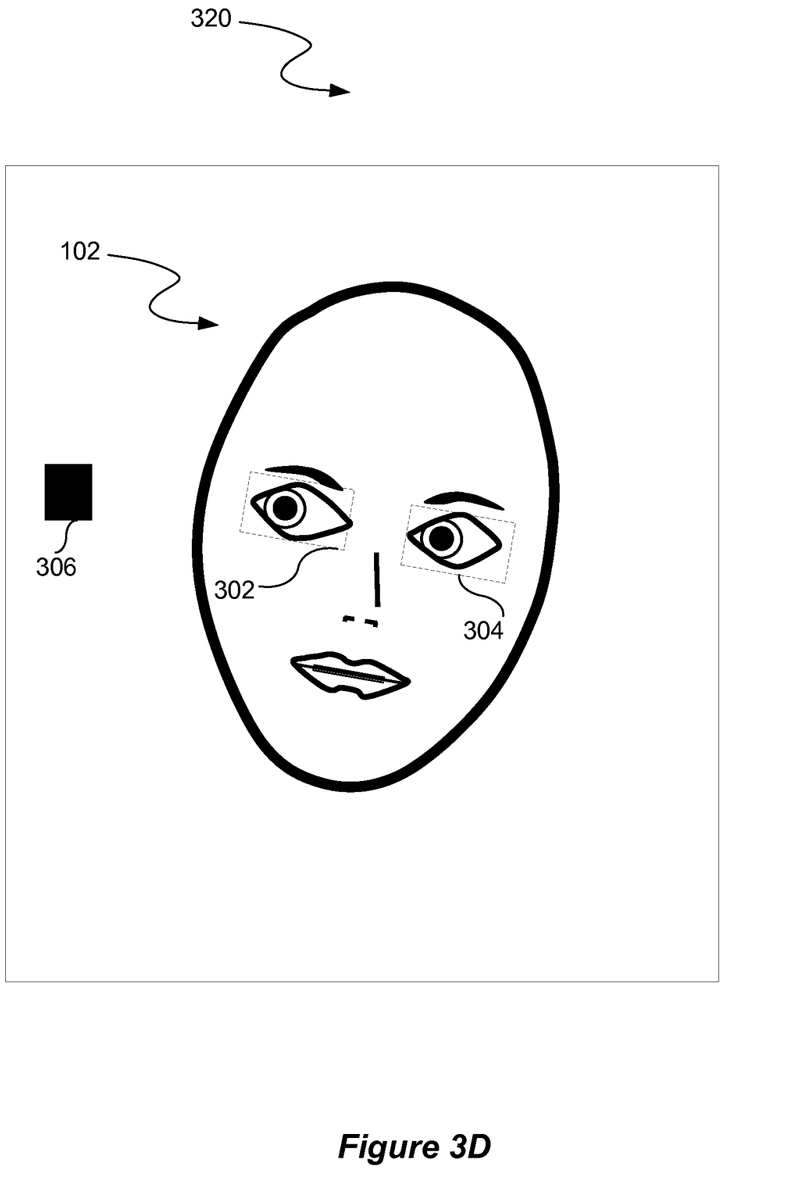
FIG. 3D illustrates an image of the participant in which the roll, i.e., orientation about the z-axis, of the head of the participant is tilted.

The examples provided in FIGS. 3A and 3B illustrate the head of the participant 102 positioned relatively straight. Alternatively, the position of the head of the participant 102 is positioned such that the head of the participant 102 has a head orientation that is not straight. FIG. 3D illustrates an image 320 of the participant 102 in which the roll, i.e., orientation about the z-axis, of the head of the participant 102 is tilted. In one implementation, the gaze tracking code detects a tilted position of the head of the participant 102, i.e., by detecting a horizontal offset of the right eye image 302 and the left eye image 304, by detecting a horizontal offset of other features of the head of the participant 102, or the like. The gaze tracking code 208 calculates the average ratio as described with respect to FIG. 3B, but also autocorrects the position of the head of the participant 102. In other words, the gaze tracking code 208 calculates the average ratio as described with respect to FIG. 3B for FIG. 3D and then adjusts the gaze of the participant 102 by the tilt of the head of the participant 102. As an example, the right eye image 302 is tilted two mm higher than the left eye image 304. Accordingly, the gaze tracking code 208 adjusts the position of the gaze graphic representation 312 higher to be in line with the head tilt.

Figure 3E:
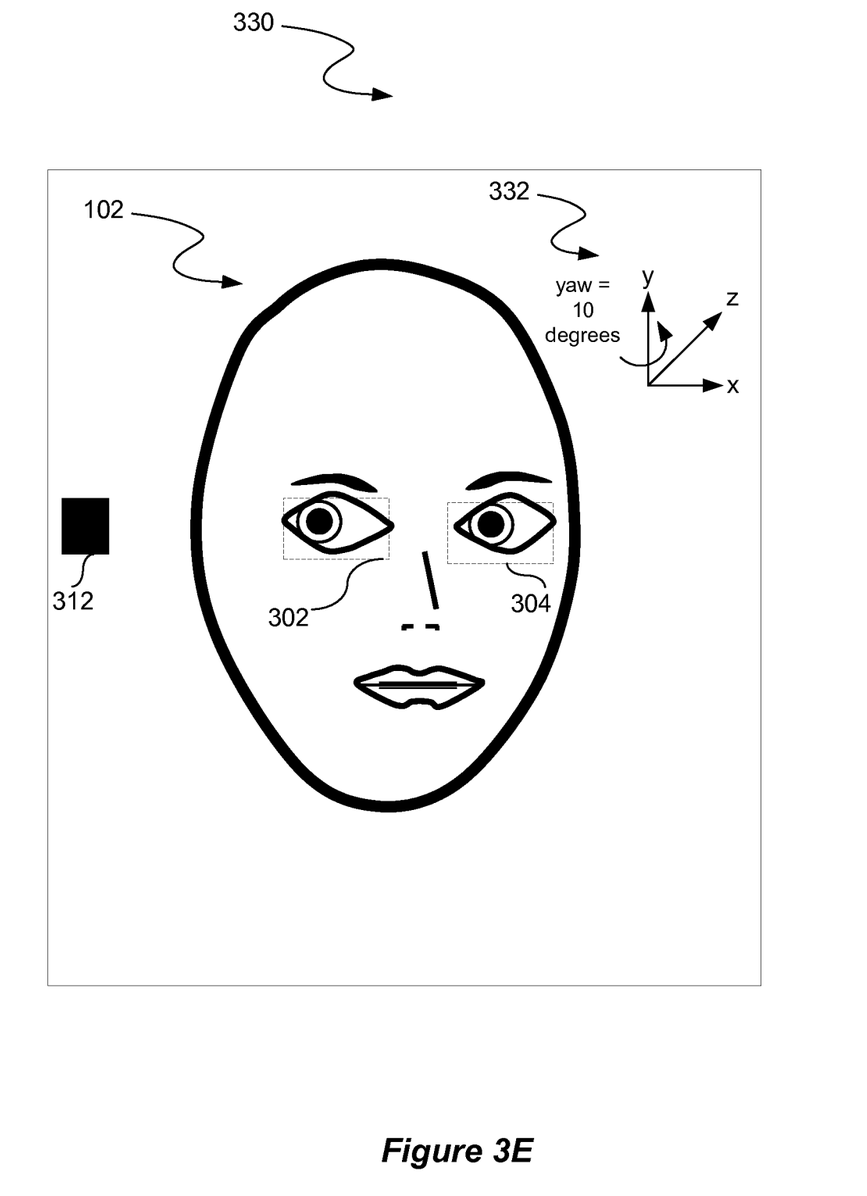
FIG. 3E illustrates an image of the participant in which the yaw, i.e., orientation about the y-axis, of the head of the participant is tilted.

FIG. 3E illustrates an image 330 of the participant 102 in which the yaw, i.e., orientation about the y-axis, of the head of the participant 102 is tilted. In other words, the head of the participant 102 is turned left. The eyes of the participant 102 are still gazing to the right even though the head of the participant 102 is turned to the left. The yaw of the head of the participant 102 sometimes indicates that the eyes of the participant 102 are gazing in the same direction as the head orientation, but FIG. 3E illustrates a situation in which the yaw is opposite of the gaze. A coordinate space 332 indicates x, y, and z directions. Further, the coordinate space indicates the direction of the yaw of the head of the participant 102 indicated in FIG. 3E, e.g., the direction of the rotation of the head around the y axis. The right eye image 302 and the left eye image 304 are directed opposite of the yaw direction. In one implementation, the gaze tracking code 208 autocorrects the amount whites in the located images based upon the yaw. In other words, the gaze tracking code 208 increments or decrements the count of white pixels on either side of the iris during the calculations so that the yaw of the head of the participant 102 is rotated around the y-axis. As a result, the ratios are calculated based upon the head of the participant 102 facing straight. As an example, the yaw may be 10 degrees counterclockwise from the perspective of the head of the participant 102. The gaze tracking code 208 may then perform an autocorrection by incrementing or decrementing the count of white pixels on either side of the iris to adjust the yaw ten degrees clockwise so that the head of the participant 102 is facing straight. The yaw may be detected by the gaze tracking code 208 by various features on the head of the participant 102 such eyebrows, eyelashes, or the like.

Figure 3F:
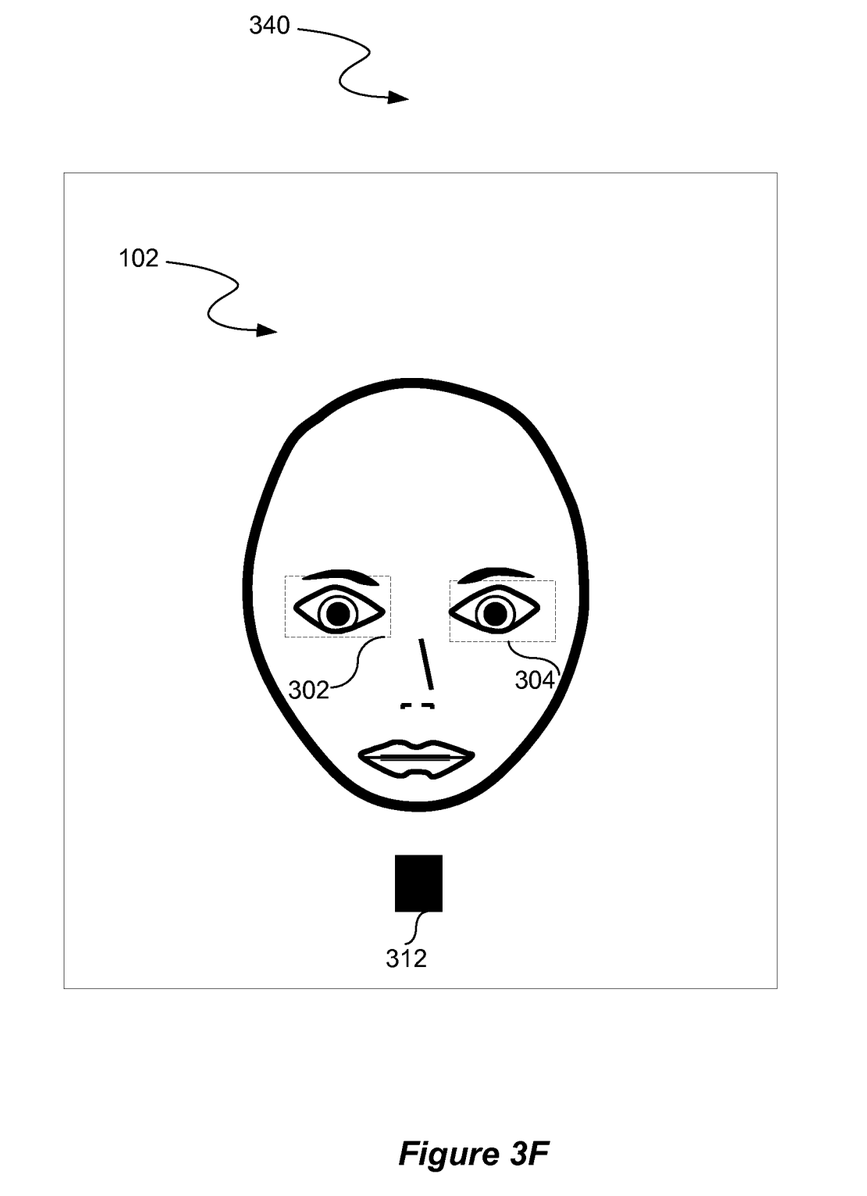
FIG. 3F illustrates an image of the participant in which the pitch, i.e., orientation about the x-axis, of the head of the participant is tilted.

FIG. 3F illustrates an image 340 of the participant 102 in which the pitch, i.e., orientation about the x-axis, of the head of the participant 102 is tilted. As an example, the participant 102 is looking downwards at an object. A change in pitch alone often involves minimal movement of the eyes sideways. Accordingly, the gaze of the participant 102 is detected without any autocorrection of the amount of white pixels in the image 340 of the eyes of the participant 102 or of the orientation of the head position of the participant 102. The ratios calculated in FIG. 3B were based on the calculating distances sideways from the sides of the eyes to the irises as the participant 102 was gazing at an object that was on a horizontal plane level with the eyes of the participant 102. FIG. 3E illustrates a change in pitch that results from the participant 102 gazing at an object that is beneath the horizontal plane of the eyes of the participant 102. As a result of the downward gaze, the amount of white pixels from the tops of the eyes to the bottoms of the iris is also calculated. For example, the ratios for the amount of white pixels measured horizontally indicate that the object is straight in front of the participant 102 whereas the ratios for the amount of white pixels measured vertically indicate that the object is beneath the participant 102. An alternative example is the participant 102 gazing at an object beneath him or her at a right diagonal. The horizontal ratios and the vertical ratios indicate that gaze.

As images of the whites of the eyes typically include more pixels than the iris and/or pupil, the gaze tracking system 106 illustrated in FIG. 1 determines the gaze of the participant 102 more effectively and less expensively than previous configurations. The relative size difference between the whites and the pupil/iris can be thought of as increasing the signal to noise ratio in the measurement such that for a given image capture device and resolution, processing power, and set of environmental conditions, measuring whites of the eyes provides a more robust indication of gaze direction The data is typically more accurate than pupil tracking configurations that often have inaccuracies resulting from interference, e.g., eyelashes being mistaken for pupils. The differences in pixel values, e.g., colors, from the whites of the eyes to even the lightest of irises allows for relatively easy border detection to determine where the whites of the eyes begin and end. Further, the image capture device 108 detects the whites of the eyes of the participant 102 at relatively large distances that are practical within an entertainment environment such as a theme park. The whites of the eyes also do not change much in color based upon varying lighting conditions, which are common in an entertainment environment such as a theme park.

Figure 4:
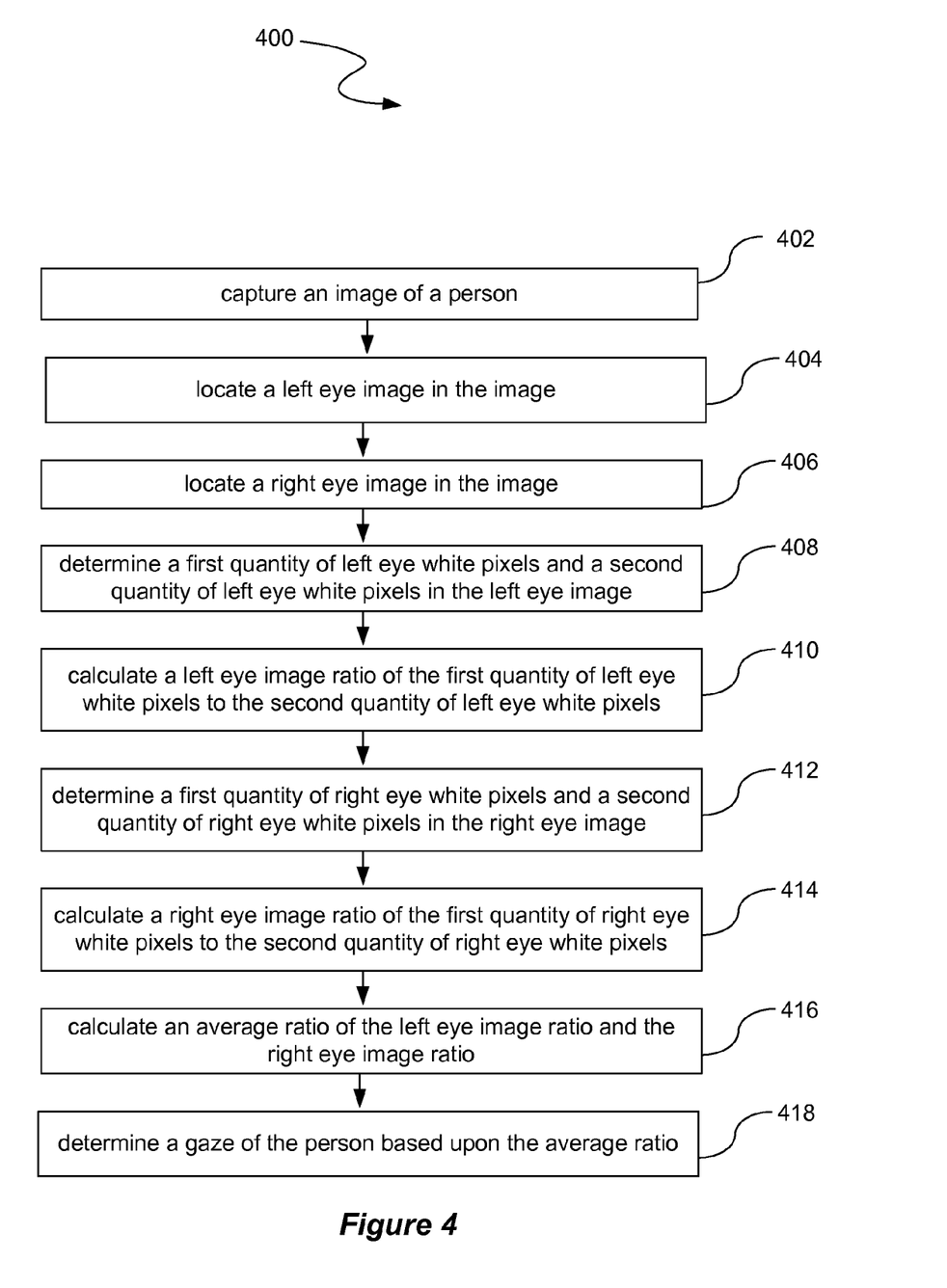
FIG. 4 illustrates a process that determines the gaze of the participant illustrated in FIG. 1.

FIG. 4 illustrates a process 400 that determines the gaze of the participant 102 illustrated in FIG. 1. At 402, the process captures an image of a person. At 404, the process 400 locates a left eye image in the image and at 406 the process 400 locates a right eye image. At 408, the process 400 determines a first quantity of left eye white pixels and a second quantity of left eye white pixels in the left eye image. The first quantity of left eye white pixels is determined from a distinct part of the left eye image than is the second quantity of left eye white pixels. At 410, the process 400 calculates a left eye image ratio of the first quantity of left eye white pixels to the second quantity of left eye white pixels. At 412, the process 400 determines a first quantity of right eye white pixels and a second quantity of right eye white pixels in the right eye image. The first quantity of right eye white pixels is determined from a distinct part of the right eye image than is the second quantity of right eye white pixels. At 414, the process 400 calculates a right eye image ratio of the first quantity of right eye white pixels to the second quantity of right eye white pixels. At 416, the process 400 calculates an average ratio of the left eye image ratio and the right eye image ratio. At 418, the process 400 determines a gaze direction, i.e., a value indicating a direction of the gaze, of the person based upon the average ratio.

Although examples are provided herein for calculating ratios of white pixels, the ratio for only one eye may be utilized in other configurations. Accordingly, the calculation of an average is not necessary in such configurations. The processes described herein may be implemented using a general purpose processor or a GPU that performs image processing and pixel based processing. The gaze tracking configurations provided herein may be implemented in a variety of environments. As an example, the gaze tracking configurations are utilized to refine motion capture animation. By knowing where an actor is gazing during the motion capture, video producers utilize that information to more accurately re-create the eyes of the actor in the final animation. The gaze tracking configurations help avoid utilizing awkward head cameras and neuromuscular sensor on the actors, which are less comfortable than not having to wear any such wearable electronics as with the gaze tracking configurations.

Further, the gaze tracking configurations provided herein are not limited to detecting the gaze of a single person, but rather may be utilized to estimate the gaze of a group of people. During event recording, knowing where a live audience is gazing on a sports field or stage allows for automatic control of a camera to point the camera to the place of interest of the audience. For example, the gaze tracking configuration is configured to detect if a large quantity of audience members are gazing in the same direction. The gaze tracking configuration then provides that gaze data to a camera that is configured to automatically adjust to its orientation in the direction of the gaze. Similarly, understanding how a live audience pays attention to a film presentation or theatrical stage presentation can provide a director with valuable information about how the audience is receiving a film or play.

In one implementation, the gaze tracking configuration provided herein is utilized to provide advertisers with data to determine which portions of advertisements are most viewed by potential customers. The gaze tracking configuration records where a viewer is gazing with respect to a television screen, poster, newspaper, magazine, etc. Such information is helpful in determining the effectiveness of particular advertising and possible products and/or services of interest. An advertiser may learn that viewers spend much more time viewing advertisements of a particular product rather than a competing product. In contrast with most advertising that is difficult to quantify with respect to effectiveness, the gaze tracking configuration provides data that may be compiled into a detailed analysis as to the efficacy of a particular advertising. As a result, an advertiser accurately calculates whether or not an advertisement is working or not so that resources are effectively allocated.

The generic responses and/or specific responses are also utilized with interactive displays. As an example, the gaze tracking system 104 is in operable communication with an interactive display. As the participant 102 gazes at the display, a generic response of displaying an advertisement is displayed. Alternatively, a specific response is directed to the portion of the display that is being viewed by the participant 102. As an example, the participant 102 is only gazing at an animated video in the display and ignoring the remainder of the display. The gaze tracking system 104 detects the specific gaze and responds by automatically adjusting the contrast, brightness, and/or sharpness of the animated video. In one implementation, the automatic adjustments are performed by the gaze tracking system 104 detecting the gaze response of the participant. For example, the gaze tracking system 104 detects the participant 102 gazing at the animated video portion of the display and adjusts the brightness. The gaze tracking system 104 then detects that the participant 104 immediately gazes away from the animated video portion of the display, e.g., a gaze away within a predetermined time threshold. The gaze away by the participant 102 within a relatively small time period is likely an indication that the brightness adjustment was to large. The gaze tracking system 104 then automatically reduces the brightness of the display to a level that is more than the original brightness, but less than the previously adjusted brightness. The gaze tracking system 104 may then adjust the brightness iteratively until detecting that the participant 102 is content with the brightness or other display feature. As a result, the gaze tracking system 104 allows for the automatic adjustment of display features customizable to the participant 104 without the participant 102 having to request the customization.

The specific responses are not limited to videos, pictures, or the like in their entireties. The specific responses are also implemented with respect to the gaze of the participant directed toward a particular scene character, object, or the like within a video, picture, or the like.

In another implementation, the gaze tracking system 104 is utilized for security purposes. A security camera is in operable communication with the gaze tracking system 106. The gaze tracking system analyzes image data received from the security camera to determine if the gaze of a person is directed toward a particular person or object that has to remain secure.

The gaze tracking system 104 can be implemented with a relatively inexpensive image capture device, removes the necessity of wearing uncomfortable wearable electronics as utilized in various previous configurations, is not limited to impractical gazing distances, and is not restricted based upon various lighting conditions. Further, the gaze tracking system 104 has applicability to various entertainment environments to help improve the viewing experience of participants, the development of motion capture animation, the efficacy of advertising, and/or any implementation in which determining the gaze of the participant 102 is helpful.

It is understood that the apparatuses, systems, computer program products, and processes described herein may also be applied in other types of apparatuses, systems, computer program products, and processes. Those skilled in the art will appreciate that the various adaptations and modifications of the implementations of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A computer program product comprising a non-transitory computer readable storage device having a computer readable program stored thereon, wherein the computer readable program while executing on a computer causes the computer to:

capture an image of a person;
locate a left eye image in the image;
locate a right eye image in the image;
determine a first quantity of left eye white pixels and a second quantity of left eye white pixels in the left eye image, the first quantity of left eye white pixels being determined from a distinct part of the left eye image than is the second quantity of left eye white pixels;
calculate a left eye image ratio of the first quantity of left eye white pixels to the second quantity of left eye white pixels;
determine a first quantity of right eye white pixels and a second quantity of right eye white pixels in the right eye image, the first quantity of right eye white pixels being determined from a distinct part of the right eye image than is the second quantity of right eye white pixels;
calculate a right eye image ratio of the first quantity of right eye white pixels to the second quantity of right eye white pixels;
mathematically adjust the left eye image ratio and/or the right eye image ratio based upon a head orientation of the person;
calculate an average ratio of the left eye image ratio and the right eye image ratio; and
determine a gaze direction of the person based upon the average ratio.

2. The computer program product of claim 1, wherein the first quantity of left white eye pixels is measured from a left side of the left eye to an iris of the left eye.

3. The computer program product of claim 1, wherein the second quantity of left white eye pixels is measured from a right side of the left eye to an iris of the left eye.

4. The computer program product of claim 1, wherein the first quantity of right white eye pixels is measured from a right side of the right eye to an iris of the right eye.

5. The computer program product of claim 1, wherein the second quantity of right white eye pixels is measured from a left side of the right eye to an iris of the right eye.

6. The computer program product of claim 1, wherein the computer is further caused to provide gaze data based upon the gaze direction to an interactive device.

7. The computer program product of claim 6, wherein the interactive device interacts with the person based upon the gaze data.

8. The computer program product of claim 6, wherein the interactive device automatically adjusts a display based upon the gaze data.

9. The computer program product of claim 1, wherein the computer is further caused to provide gaze data based upon the gaze to a motion capture system that generates animation data based upon the gaze data.

10. A method comprising:

capturing an image of a person;
locating a left eye image in the image;
locating a right eye image in the image;
determining a first quantity of left eye white pixels and a second quantity of left eye white pixels in the left eye image, the first quantity of left eye white pixels being determined from a distinct part of the left eye image than is the second quantity of left eye white pixels;
calculating a left eye image ratio of the first quantity of left eye white pixels to the second quantity of left eye white pixels;
determining a first quantity of right eye white pixels and a second quantity of right eye white pixels in the right eye image, the first quantity of right eye white pixels being determined from a distinct part of the right eye image than is the second quantity of right eye white pixels;

calculating a right eye image ratio of the first quantity of right eye white pixels to the second quantity of right eye white pixels;

mathematically adjusting the left eye image ratio and/or the right eye image ratio based upon a head orientation of the person;

calculating an average ratio of the left eye image ratio and the right eye image ratio; and determining a gaze direction of the person based upon the average ratio.

11. The method of claim 10, wherein the first quantity of left white eye pixels is measured from a left side of the left eye to an iris of the left eye.

12. The method of claim 10, wherein the second quantity of left white eye pixels is measured from a right side of the left eye to an iris of the left eye.

13. The method of claim 10, wherein the first quantity of right white eye pixels is measured from a right side of the right eye to an iris of the right eye.

14. The method of claim 10, wherein the second quantity of right white eye pixels is measured from a left side of the right eye to an iris of the right eye.

15. The method of claim 10, wherein further comprising providing gaze data based upon the gaze to an interactive device.

16. The method of claim 15, wherein the interactive device interacts with the person based upon the gaze data.

17. The method of claim 15, wherein the interactive device automatically adjusts a display based upon the gaze data.

18. The method of claim 10, further comprising providing gaze data based upon the gaze direction to a motion capture system that generates animation data based upon the gaze data.

19. A system comprising:
an image capture device that captures an image of a person; and
a gaze tracking system that locates a left eye image in the image, locates a right eye image from the image, determines a first quantity of left eye white pixels and a second quantity of left eye white pixels in the left eye image, calculates a left eye image ratio of the first quantity of left eye white pixels to the second quantity of left eye white pixels, determines a first quantity of right eye white pixels and a second quantity of right eye white pixels in the right eye image, calculates a right eye image ratio of the first quantity of right eye white pixels to the second quantity of right eye white pixels, mathematically adjusts the left eye image ratio and/or the right eye image ratio based upon a head orientation of the person, calculates an average ratio of the left eye image ratio and the right eye image ratio, and determines a gaze of the person based upon the average ratio, the first quantity of left eye white pixels being determined from a distinct part of the left eye image than is the second quantity of left eye white pixels, the first quantity of right eye white pixels being determined from a distinct part of the right eye image than is the second quantity of right eye white pixels.

20. The system of claim 19, further comprising an interactive device that receives gaze data based upon the gaze and interacts with the person based upon the gaze data.

21. A method comprising:
capturing an image of a person;
locating eye image data in the image;
determining a first quantity of white pixels and a second quantity of white pixels from the eye image data, the first quantity of white pixels being distinct from the second quantity of white pixels, the first quantity of white pixels being determined from a distinct part of the eye image data than is the second quantity of white pixels;
calculating a ratio of the first quantity of white pixels to the second quantity of white pixels;
mathematically adjusting the ratio based upon a head orientation of the person; and
determining a gaze direction of the person based upon the ratio.

22. The method of claim 21, further comprising providing gaze data based upon the gaze direction to an interactive device.

* * * * *